(12) United States Patent
Taylor et al.

(10) Patent No.: US 7,341,103 B2
(45) Date of Patent: Mar. 11, 2008

(54) COMPOSITIONS AND METHODS FOR TREATING SUBTERRANEAN FORMATIONS WITH LIQUEFIED PETROLEUM GAS

(75) Inventors: Robert S. Taylor, Calgary (CA); Gary P. Funkhouser, Duncan, OK (US); Ronald G. Dusterhoft, Katy, TX (US); Robert S. Lestz, Missouri City, TX (US); Audis Byrd, Katy, TX (US)

(73) Assignees: Halliburton Energy Services, Inc., Duncan, OK (US); Chevron U.S.A. Inc., San Ramon, CA (US)

( * ) Notice: Subject to any disclaimer, the term of this patent is extended or adjusted under 35 U.S.C. 154(b) by 395 days.

(21) Appl. No.: 10/788,152

(22) Filed: Feb. 26, 2004

(65) Prior Publication Data

US 2005/0189112 A1   Sep. 1, 2005

(51) Int. Cl.
*E21B 43/00* (2006.01)

(52) U.S. Cl. .................... 166/278; 166/308.1
(58) Field of Classification Search ........... 166/276, 166/292, 278, 308.1; 507/235
See application file for complete search history.

(56) References Cited

U.S. PATENT DOCUMENTS

| | | | | |
|---|---|---|---|---|
| 3,307,629 A | * | 3/1967 | Sharp | 166/292 |
| 3,765,488 A | * | 10/1973 | Pence, Jr. | 166/308.6 |
| 3,842,910 A | | 10/1974 | Zingg et al. | |
| 3,846,310 A | * | 11/1974 | Blackwell | 507/203 |
| 3,954,626 A | | 5/1976 | Greminger, Jr. et al. | |
| 4,622,155 A | | 11/1986 | Harris et al. | 507/238 |
| 4,701,270 A | | 10/1987 | Bullen et al. | 507/203 |
| 5,057,233 A | | 10/1991 | Huddleston | 507/238 |
| 5,110,485 A | | 5/1992 | Huddleston | 507/238 |
| 5,202,035 A | | 4/1993 | Huddleston | 507/238 |
| 5,417,287 A | | 5/1995 | Smith et al. | 166/308 |
| 5,556,832 A | * | 9/1996 | Van Slyke | 507/203 |
| 5,571,315 A | | 11/1996 | Smith et al. | 106/285 |
| 5,614,010 A | | 3/1997 | Smith et al. | 16/285 |
| 5,846,915 A | | 12/1998 | Smith et al. | 507/269 |
| 6,149,693 A | | 11/2000 | Geib | 44/270 |
| 6,271,409 B1 | | 8/2001 | Geib | 558/177 |
| 6,297,201 B1 | | 10/2001 | Geib | 507/244 |
| 6,342,468 B1 | | 1/2002 | Geib | 507/238 |
| 6,387,137 B1 | | 5/2002 | Geib | 44/270 |
| 6,511,944 B2 | | 1/2003 | Taylor et al. | 507/237 |
| 6,544,934 B2 | | 4/2003 | Taylor et al. | 507/238 |
| 2002/0165101 A1 | | 11/2002 | Taylor et al. | |
| 2004/0214728 A1 | | 10/2004 | Taylor et al. | |
| 2006/0166834 A1 | * | 7/2006 | Roddy | 507/140 |

FOREIGN PATENT DOCUMENTS

GB           1 422 254 A           1/1976

OTHER PUBLICATIONS

Foreign communication from related counterpart application dated Jan. 7, 2005.
R. Taylor et al., *Optimized Gas-Well Stimulation Using CO2-Miscible, Viscosified Hydrocarbon Fracturing Fluids*, Soc'y of Petroleum Engineers 75666 (2002).

* cited by examiner

*Primary Examiner*—William P. Neuder
(74) *Attorney, Agent, or Firm*—Robert A. Kent; Baker Botts L.L.P.

(57) ABSTRACT

The present invention relates to gelled fluids and methods for using liquefied petroleum gas in subterranean operations. More particularly, the present invention relates to servicing fluids that comprise gelled liquefied petroleum gas or servicing fluids that comprise a conventional gelled hydrocarbon fluid with liquefied petroleum gas and methods of using such servicing fluids in subterranean formations. One embodiment of the present invention provides a method of treating a subterranean formation comprising the steps of providing a gelled LPG fluid comprising liquefied petroleum gas and a gelling agent; and placing the gelled LPG fluid into the subterranean formation. Another embodiment of the present invention provides a method of treating a subterranean formation comprising the steps of providing a combined LPG servicing fluid comprising liquefied petroleum gas and a conventional hydrocarbon servicing fluid; and placing the combined LPG servicing fluid into the subterranean formation.

45 Claims, No Drawings

COMPOSITIONS AND METHODS FOR TREATING SUBTERRANEAN FORMATIONS WITH LIQUEFIED PETROLEUM GAS

BACKGROUND OF THE INVENTION

The present invention relates to gelled fluids and methods for using liquefied petroleum gas in subterranean operations. More particularly, the present invention relates to servicing fluids that comprise gelled liquefied petroleum gas or servicing fluids that comprise a conventional gelled hydrocarbon fluid with liquefied petroleum gas and methods of using such servicing fluids in subterranean formations.

Servicing fluids are used in a variety of operations and treatments performed in oil and gas wells. Such operations and treatments include, but are not limited to, production stimulation operations, such as fracturing, and well completion operations, such as gravel packing.

An example of a production stimulation operation using a servicing fluid having particles suspended therein is hydraulic fracturing. That is, a type of servicing fluid, referred to in the art as a fracturing fluid, is pumped through a well bore into a subterranean zone to be stimulated at a rate and pressure such that fractures are formed or enhanced in a desired subterranean zone. The fracturing fluid is generally a gel, emulsion, or foam that may comprise a particulate material often referred to as proppant. When used, proppant is deposited in the fracture and functions, inter alia, to hold the fracture open while maintaining conductive channels through which such produced fluids can flow upon completion of the fracturing treatment and release of the attendant hydraulic pressure.

An example of a well completion operation using a servicing fluid having particles suspended therein is gravel packing. Gravel packing treatments are used, inter alia, to reduce the migration of unconsolidated formation particulates into the well bore. In gravel packing operations, particulates, referred to in the art as gravel, are carried to a well bore in a subterranean producing zone by a servicing fluid known as a carrier fluid. That is, the particulates are suspended in a carrier fluid, which may be viscosified, and the carrier fluid is pumped into a well bore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the well bore. While screenless gravel packing operations are becoming more common, traditional gravel pack operations involve placing a gravel pack screen in the well bore and packing the surrounding annulus between the screen and the well bore with gravel sized to prevent the passage of formation particulates through the pack with produced fluids, wherein the well bore may be oriented from vertical to horizontal and extend from hundreds of feet to thousands of feet. When installing the gravel pack, the gravel is carried to the formation in the form of a slurry by mixing the gravel with a viscosified carrier fluid. Such gravel packs may be used to stabilize a formation while causing minimal impairment to well productivity. The gravel, inter alia, acts to prevent the particulates from occluding the screen or migrating with the produced fluids, and the screen, inter alia, acts to prevent the gravel from entering the well bore.

In some situations the processes of hydraulic fracturing and gravel packing are combined into a single treatment to provide a stimulated production and an annular gravel pack to prevent formation sand production. Such treatments are often referred to as "frac pack" operations. In some cases the treatments are completed with a gravel pack screen assembly in place with the hydraulic fracturing treatment being pumped through the annular space between the casing and screen. In this situation the hydraulic fracturing treatment ends in a screen out condition creating an annular gravel pack between the screen and casing. This allows both the hydraulic fracturing treatment and gravel pack to be placed in a single operation. In other cases the fracturing treatment may be performed prior to installing the screen and placing a gravel pack.

In carrying out hydraulic fracturing, frac packing, and gravel packing, fluid recovery oftentimes is critical. Foamed fluids have been developed in part to provide enhanced fluid recovery through energization by a compressed gas phase. They also reduce the total amount of liquid used, typically by a factor of about four. Such foamed fluids have included various surfactants, known as foaming and foam stabilizing agents, for facilitating the foaming and stabilization of the foam produced when a gas is mixed with the servicing fluid. Thus, foamed fluids may be thought of as media in which a relatively large volume of gas is dispersed in a relatively small volume of liquid, usually with the aid of a surfactant that reduces the surface tension of the fluids. The most commonly used gases for foamed fracture fluids are nitrogen, carbon dioxide, and combinations of the two. Foamed servicing fluids may be preferred over conventional servicing fluids because they generally provide superior fluid recovery as well as excellent fluid loss control without forming a substantial filter cake. Enhanced fluid recovery is provided by the expansion of the gas in the foam when the pressure is released after the stimulation and/or treatment. This promotes flow of residual servicing fluid liquid back into the well, thus aiding in cleanup of the servicing fluid once the subterranean operation is complete.

The use of conventional water-based servicing fluids in subterranean operations may present disadvantages. For instance, the high capillary pressures associated with the use of an aqueous system may restrict the flow of produced gaseous hydrocarbons such as methane. Capillary pressures of several thousand psi may result in low permeability formations, wherein the high pressure differential needed to initiate gas flow may result in extended fluid recovery times, or permanent loss of effective fracture half length. Furthermore, the use of water in under-saturated reservoirs also may reduce permeability and associated gas flow through a permanent increase in the water saturation of the reservoir.

The use of a carbon dioxide miscible hydrocarbon servicing fluid may overcome these limitations through achievement of a miscible drive mechanism where produced methane is used to displace the hydrocarbon fracturing fluid from the formation. To facilitate this process, more volatile hydrocarbon blends may be used in place of traditional hydrocarbon servicing fluids such as diesel fuel. For example, carbon dioxide may be added to the hydrocarbon-based servicing fluids, inter alia, to increase the efficiency by which methane can displace it and provide increased energy for fluid recovery and thus its rate of recovery from the subterranean formation. However, increasing concentrations of dissolved carbon dioxide in the liquid hydrocarbon make it progressively more difficult to gel with phosphate ester and alkylphosphonic acid ester gel systems. As a result there is a limit to the concentration of carbon dioxide that may be present in such servicing fluids. For instance, if too high a concentration of carbon dioxide is present, the servicing fluid may not have a viscosity sufficient to carry the needed quantity of particulates to a desired location within a well bore, to adequately control fluid leak off, and to generate the desired fracture geometry.

Moreover, as a fracture or a gravel pack is created, a portion of the liquid contained in the servicing fluid may leak off into the formation and/or may create a filter cake comprising deposited viscosifier on the walls of the fracture, well bore, or the formation. In addition, conventional water-based servicing fluids may comprise polysaccharide-based polymers, which may serve as a food source for bacteria. Therefore, when deposited in the subterranean formation, such polysaccharide-based polymers may produce a biomass that may reduce formation permeability. While formation of a filter cake during pumping may be desirable to help control fluid leak off, it is not desirable for the filter cake to be permanent since it may restrict subsequent gas and liquid flow.

SUMMARY OF THE INVENTION

The present invention relates to gelled fluids and methods for using liquefied petroleum gas in subterranean operations. More particularly, the present invention relates to servicing fluids that comprise gelled liquefied petroleum gas or servicing fluids that comprise a conventional gelled hydrocarbon fluid with liquefied petroleum gas and methods of using such servicing fluids in subterranean formations.

One embodiment of the present invention provides a method of treating a subterranean formation comprising the steps of providing a gelled LPG fluid comprising liquefied petroleum gas and a gelling agent; and placing the gelled LPG fluid into the subterranean formation.

Another embodiment of the present invention provides a method of treating a subterranean formation comprising the steps of providing a combined LPG servicing fluid comprising liquefied petroleum gas and a conventional hydrocarbon servicing fluid; and placing the combined LPG servicing fluid into the subterranean formation.

Still another embodiment of the present invention provides a servicing fluid comprising liquefied petroleum gas and a gelling agent.

Another embodiment of the present invention provides a servicing fluid comprising a liquified petroleum gas and a conventional gelled hydrocarbon fluid.

The features and advantages of the present invention will be readily apparent to those skilled in the art upon a reading of the description of the exemplary embodiments that follows.

DESCRIPTION OF EXEMPLARY EMBODIMENTS

The present invention relates to gelled fluids and methods for using liquefied petroleum gas in subterranean operations. More particularly, the present invention relates to servicing fluids that comprise gelled liquefied petroleum gas or servicing fluids that comprise a conventional gelled hydrocarbon fluid with liquefied petroleum gas and methods of using such servicing fluids in subterranean formations.

While the compositions and methods of the present invention may be useful in a variety of applications, such as in the stimulation of coal seams, they are particularly useful for stimulation and well completion operations, such as, but not limited to, fracturing, gravel packing and frac pack applications, performed in subterranean wells such as oil and gas wells. The compositions of the present invention are completely hydrocarbon based and so can be produced and even sold with the produced fluids and have a reduced environmental impact versus water-based fluids.

Some embodiments of the present invention provide improved servicing fluids comprising gelled liquefied petroleum gas ("LPG") and methods of using such fluids. Other embodiments of the present invention provide improved servicing fluids comprising LPG and a conventional gelled hydrocarbon fluid and methods of using such fluids. In embodiments of the present invention wherein LPG is combined with a conventional hydrocarbon servicing fluid, the LPG may be either gelled or ungelled.

As used herein, the term "LPG" refers to a hydrocarbon provided in a liquid state that is a gas at standard conditions of 60° F. and 1 atmosphere (14.7 psia). Examples of such hydrocarbons include, but are not limited to, methane, ethane, propane, butane, and iso-butane. In exemplary embodiments, LPG fluids of the present invention may further comprise other hydrocarbon components that are a liquid at standard conditions, having five carbon atoms or more, which may be present in commercial supplies of LPG. In order to maintain its liquid form, sufficient pressure should be applied to the LPG and the servicing fluids of the present invention. This could require a surface storage pressure of up to 300 psi, dependent upon ambient conditions. Typical pumping pressures during well completion operations such as fracturing are commonly well over 1000 psi, ensuring the LPG will be a liquid while pumping on surface and will remain fully dissolved in any liquid hydrocarbon added to it. Among other things, the presence of the LPG in the servicing fluids of the present invention may help maximize fluid recovery from the subterranean formation while minimizing formation damage associated with water-based fluids. For example, where an LPG servicing fluid of the present invention is placed into a subterranean formation under pressure, when that pressure is released, the LPG may attempt to reach pressure equilibrium by flowing towards the lower pressure in the well bore and at the surface of the well. As the LPG attempts to return to the surface, it provides energy which facilitates removal of some or all of the remaining liquid portion of the servicing fluid from the well bore, a necessary step that occurs before the well is placed on production. Moreover, the volatility of LPG in the subterranean formation may act to reduce the viscosity of the LPG servicing fluids thereby allowing for easier recovery. In addition, the LPG may remove filter cake buildup after the treatment in the subterranean formation through energy provided by the vapor pressure of the LPG at the reservoir temperature. The use of LPG may reduce formation damage, inter alia, by reducing the high capillary pressures associated with water-based fluids while providing a means for fluid recovery.

While some embodiments of the present invention rely on a conventional gelled hydrocarbon fluid to provide viscosity, other embodiments of the present invention gel the LPG fluid itself to provide or enhance the total fluid viscosity. In order to gel LPG, a gelling agent may be added. Any gelling agent known by those skilled in the art to be suitable for gelling hydrocarbon-based fluids may be suitable for use in the present invention. For example, suitable gelling agents may include ferric iron or aluminum polyvalent metal complexes of orthophosphoric acid esters or ferric iron or aluminum polyvalent metal complexes of alkylphosphonic acid esters, or ferric iron or aluminum polyvalent metal complexes of unsymmetrical dialkylphosphinic acids or mixtures thereof. Examples of such iron or aluminum polyvalent metal salts of an alkylphosphonic acid ester are provided in Taylor et al., U.S. Pat. No. 6,511,944, issued on Jan. 28, 2003, the relevant disclosure of which is incorporated herein by reference. Where used, the gelling agent may be added to the LPG servicing fluids of the present invention in an amount sufficient to provide the desired degree of gelling based, inter alia, on the specific gelling agent used. In an exemplary embodiment, the gelling agent is present in the LPG servicing fluids of the present invention in an amount in the range of from about 0.1% to about 2.5% by weight of LPG present in the servicing fluid.

Some embodiments of the present invention combine LPG with a conventional hydrocarbon servicing fluid. Where a conventional hydrocarbon servicing fluid is used along with a LPG fluid, the LPG fluid may be either gelled or ungelled. In some embodiments of the present invention, a conventional hydrocarbon fluid may be combined with a gelled or ungelled LPG fluid at the well head directly before the combined servicing fluid is injected into the subterranean formation. In an exemplary embodiment, the conventional hydrocarbon fluid may be gelled. Because the LPG and conventional hydrocarbon portions of the combined servicing fluid are fully miscible when combined under pressure, any gelling agent added to either of both the LPG and conventional hydrocarbon portions will equilibrate in concentration in the combined servicing fluid. As a result, both the LPG and conventional hydrocarbon portions will be gelled if either is gelled, forming a homogeneous gelled servicing fluid. In such embodiments, traditional equipment can be used to create a conventional gelled hydrocarbon fluid comprising any of the various servicing fluid additives commonly used in the art. Such additives include, but are not limited to particulates, delayed breakers, surfactants, weighting agents, and fluid loss control additives.

The LPG fluids and conventional gelled hydrocarbon fluids may be combined in amounts sufficient to provide the desired stimulation and/or desired completion of the subterranean formation and provide maximum fluid recovery from the subterranean formation. The greater the concentration of LPG present in the combined servicing fluid less of the conventional hydrocarbon servicing fluid must be recovered from the subterranean formation. In some embodiments of the present invention it may be desirable to alter the relative percentages of the LPG fluid to the conventional gelled hydrocarbon fluid throughout the life of the treatment. This may be particularly true in embodiments wherein proppant is present only in the conventional gelled hydrocarbon fluid. In such cases, it may be advantageous to adjust the LPG content of the total fluid throughout the life of the treatment to maximize LPG content while achieving the desired downhole proppant concentration. For example, where a servicing fluid of the present invention comprising LPG and a conventional gelled hydrocarbon fluid is used as a fracturing fluid, it may be desirable to begin the treatment using a fluid comprising 100% LPG and no conventional gelled hydrocarbon fluid. As the treatment progresses, the percentage of conventional gelled hydrocarbon fluid may increase or fluctuate as needed to effect the desired downhole proppant concentration. For example, an LPG fluid may be combined with a conventional gelled hydrocarbon fluid at a well site using conventional equipment by adding proppant and other additives directly to the conventional gelled hydrocarbon fluid and then combining that fluid with an LPG fluid on the surface. In a preferred embodiment, the blender proppant concentration may be held constant at the maximum concentration desired, and the ratio of LPG fluid to the conventional gelled hydrocarbon fluid varied to achieve the desired downhole proppant concentration. Moreover, the pumping rate of both the LPG fluid and the conventional gelled hydrocarbon fluid may be varied during the treatment to achieve the desired downhole slurry pumping rate. Such an embodiment may allow for a more efficient fracturing operation. Table 1, below, illustrates one potential such fracturing schedule and is not meant to be a limiting example.

TABLE 1

| Downhole Proppant Concentration | % Conventional Hydrocarbon | % LPG | Blender Proppant Concentration |
|---|---|---|---|
| 0 (Pad) | 0% | 100% | 0 |
| 2 lb/gal | 20% | 80% | 10 lb/gal |
| 3 lb/gal | 30% | 70% | 10 lb/gal |
| 4 lb/gal | 40% | 60% | 10 lb/gal |
| 5 lb/gal | 50% | 50% | 10 lb/gal |
| 6 lb/gal | 60% | 40% | 10 lb/gal |
| 7 lb/gal | 70% | 30% | 10 lb/gal |
| 8 lb/gal | 80% | 20% | 10 lb/gal |
| 9 lb/gal | 90% | 10% | 10 lb/gal |
| 10 lb/gal | 100% | 0% | 10 lb/gal |

In the embodiment described in Table 1, a fracturing treatment begins with 100% concentration of LPG in the servicing fluid. Because in this embodiment proppant is added to the conventional gelled hydrocarbon fluid, the concentration of the conventional gelled hydrocarbon fluid present in the combined servicing fluid is increased throughout the fracturing operation to achieve the desired downhole proppant concentration. A 100% concentration of the conventional gelled hydrocarbon fluid is used at the end of the fracturing operation, inter alia, to reduce the presence of gas in the well head when flow lines are disconnected after the treatment. It is within the ability of one skilled in the art, with the benefit of this disclosure, to determine the relative percentages of LPG and conventional gelled hydrocarbon fluid suitable for use in a particular operation.

Conventional gelled hydrocarbon fluids used in the present invention may be any gelled hydrocarbon-based fluid that is suitable for use in fracturing, gravel packing, or frac packing a subterranean formation. For example, the conventional gelled hydrocarbon fluid may comprise a hydrocarbon liquid and a gelling agent. The hydrocarbon liquid used in the conventional gelled hydrocarbon fluids may be any suitable hydrocarbon liquid including, but not limited to olefins, esters, kerosene, diesel oil, gas oil (e.g., gas condensate), fuel oil, other petroleum distillates, and certain mixtures of crude oil. The gelling agents used in the conventional gelled hydrocarbon fluids may be any gelling agents suitable for gelling hydrocarbon-base fluids, such as those described above for gelling LPG. Additionally, the conventional gelled hydrocarbon fluid may further comprise additional additives suitable for use in subterranean operations such as particulates or delayed gel breakers.

In certain embodiments, the LPG servicing fluids of the present invention may comprise particulates (such as gravel or proppant). Particulates used in accordance with the present invention are generally of a size such that formation particulates that may migrate with produced fluids are prevented from being produced from the subterranean formation. Any suitable particulate may be used including, but not limited to, graded sand, bauxite, ceramic materials, glass materials, nut hulls, polymer beads, and the like. Generally, the particulates have a size in the range of from about 4 to about 400 mesh, U.S. Sieve Series. In an exemplary embodiment, the particulates may be present in the LPG servicing fluids of the present invention in an amount less than about 20 lbs/gallon of the LPG servicing fluid. In other embodiments, the particulates may be present in the LPG servicing fluids of the present invention in an amount less than about 14 lbs/gallon of the LPG servicing fluid. Additional additives, such as gel breakers, weighting additives, fluid loss additives, and surfactants, may be added to the LPG servicing fluids of the present invention as deemed appropriate by one skilled in the art with the benefit of this disclosure. For example, delayed gel breakers may be added to the LPG servicing fluids to reduce the viscosity of the gelled LPG servicing fluid after the stimulation and/or completion operation is complete.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of treating a subterranean formation comprising the steps of:
    providing a gelled LPG fluid comprising liquefied petroleum gas and a gelling agent that comprises at least one gelling agent selected from the group consisting of: a polyvalent metal complex of an orthophosphoric acid ester, a polyvalent metal complex of an alkylphosphonic acid ester, a polyvalent metal complex of an unsymmetrical dialkylphosphinic acid, and any combination thereof; and
    placing the gelled LPG fluid into the subterranean formation.

2. The method of claim 1 wherein the liquefied petroleum gas comprises at least one compound selected from the group consisting of: methane, ethane, propane, butane, isobutane, and any combination thereof.

3. The method of claim 1 wherein gelling agent is present in the gelled LPG fluid in an amount in the range of from about 0.1% to about 2.5% by weight of the gelled LPG fluid.

4. The method of claim 1 wherein the gelling agent comprises at least one gelling agent selected from the group consisting of: a ferric iron polyvalent metal complex of an alkylphosphonic acid ester and an aluminum polyvalent metal complex of an alkylphosphonic acid ester.

5. The method of claim 1 wherein the gelling agent comprises at least one gelling agent selected from the group consisting of: a ferric iron polyvalent metal complex of an orthophosphoric acid ester and an aluminum polyvalent metal complex of an orthophosphoric acid ester.

6. The method of claim 1 wherein the gelling agent comprises at least one gelling agent selected from the group consisting of: a ferric iron polyvalent metal complex of an unsymmetrical dialkylphosphinic acid and an aluminum polyvalent metal complex of an unsymmetrical dialkylphosphinic acid.

7. The method of claim 1 wherein the gelled LPG fluid further comprises particulates.

8. A method of fracturing a subterranean formation comprising the steps of:
    providing a fracturing fluid comprising liquefied petroleum gas and a gelling agent that comprises at least one gelling agent selected from the group consisting of: a polyvalent metal complex of an orthophosphoric acid ester, a polyvalent metal complex of an alkylphosphonic acid ester, a polyvalent metal complex of an unsymmetrical dialkylphosphinic acid, and any combination thereof; and
    placing the fracturing fluid into the subterranean formation at a pressure sufficient to create or extend at least one fracture in the subterranean formation.

9. The method of claim 8 wherein the liquefied petroleum gas comprises at least one compound selected from the group consisting of: methane, ethane, propane, butane, isobutane, and any combination thereof.

10. The method of claim 8 wherein gelling agent is present in the gelled LPG fluid in an amount in the range of from about 0.1% to about 2.5% by weight of the gelled LPG fluid.

11. The method of claim 8 wherein the gelling agent comprises at least one gelling agent selected from the group consisting of: a ferric iron polyvalent metal complex of an alkylphosphonic acid ester and an aluminum polyvalent metal complex of an alkylphosphonic acid ester.

12. The method of claim 8 wherein the gelling agent comprises at least one gelling agent selected from the group consisting of: a ferric iron polyvalent metal complex of an orthophosphoric acid ester and an aluminum polyvalent metal complex of an orthophosphoric acid ester.

13. The method of claim 8 wherein the gelling agent comprises at least one gelling agent selected from the group consisting of: a ferric iron polyvalent metal complex of an unsymmetrical dialkylphosphinic acid and an aluminum polyvalent metal complex of an unsymmetrical dialkylphosphinic acid.

14. The method of claim 8 wherein the fracturing fluid further comprises particulates.

15. A method of gravel packing along a well bore comprising the steps of:
    providing a gravel pack composition comprising gelled LPG fluid comprising liquefied petroleum gas, a gelling agent that comprises at least one gelling agent selected from the group consisting of: a polyvalent metal complex of an orthophosphoric acid ester, a polyvalent metal complex of an alkylphosphonic acid ester, a polyvalent metal complex of an unsymmetrical dialkylphosphinic acid, and any combination thereof, and gravel particulates; and,
    introducing the gravel pack composition to a well bore such that the particulates form a gravel pack substantially adjacent to the well bore.

16. The method of claim 15 wherein the liquefied petroleum gas comprises at least one compound selected from the group consisting of: methane, ethane, propane, butane, isobutane, and any combination thereof.

17. The method of claim 15 wherein gelling agent is present in the gelled LPG fluid in an amount in the range of from about 0.1% to about 2.5% by weight of the gelled LPG fluid.

18. The method of claim 15 wherein the gelling agent comprises at least one gelling agent selected from the group consisting of: a ferric iron polyvalent metal complex of an alkylphosphonic acid ester and an aluminum polyvalent metal complex of an alkylphosphonic acid ester.

19. The method of claim 15 wherein the gelling agent comprises at least one gelling agent selected from the group consisting of: a ferric iron polyvalent metal complex of an orthophosphoric acid ester and an aluminum polyvalent metal complex of an orthophosphoric acid ester.

20. The method of claim 15 wherein the gelling agent comprises at least one gelling agent selected from the group consisting of: a ferric iron polyvalent metal complex of an unsymmetrical dialkylphosphinic acid and an aluminum polyvalent metal complex of an unsymmetrical dialkylphosphinic acid.

21. A method of treating a subterranean formation comprising the steps of:
    providing a combined LPG servicing fluid comprising: a liquefied petroleum gas, a gelling agent that comprises at least one gelling agent selected from the group consisting of: a polyvalent metal complex of an orthophosphoric acid ester, a polyvalent metal complex of an alkylphosphonic acid ester, a polyvalent metal complex of an unsymmetrical dialkylphosphinic acid, and any combination thereof, and a hydrocarbon-based servicing fluid; and placing the combined LPG servicing fluid into the subterranean formation.

22. The method of claim 21 wherein the liquefied petroleum gas comprises at least one compound selected from the group consisting of: methane, ethane, propane, butane, isobutane, and any combination thereof.

23. The method of claim 21 wherein the liquefied petroleum gas comprises at least one LPG fluid selected from the group consisting of: a gelled LPG fluid, an ungelled LPG fluid, and any combination thereof.

24. The method of claim 21 wherein gelling agent is present in the gelled LPG fluid in an amount in the range of from about 0.1% to about 2.5% by weight of the gelled LPG fluid.

25. The method of claim 21 wherein the gelling agent comprises at least one gelling agent selected from the group consisting of: a ferric iron polyvalent metal complex of an alkylphosphonic acid ester and an aluminum polyvalent metal complex of an alkylphosphonic acid ester.

26. The method of claim 21 wherein the gelling agent comprises at least one gelling agent selected from the group consisting of: a ferric iron polyvalent metal complex of an orthophosphoric acid ester and an aluminum polyvalent metal complex of an orthophosphoric acid ester.

27. The method of claim 21 wherein the gelling agent comprises at least one gelling agent selected from the group consisting of: a ferric iron polyvalent metal complex of an unsymmetrical dialkylphosphinic acid and an aluminum polyvalent metal complex of an unsymmetrical dialkylphosphinic acid.

28. The method of claim 21 wherein the combined LPG servicing fluid further comprises particulates.

29. The method of claim 21 wherein the relative percentages of the amount of the liquefied petroleum gas combined with the amount of the hydrocarbon-based servicing fluid varies during the treatment.

30. A method of fracturing a subterranean formation comprising the steps of:

providing a fracturing fluid comprising liquefied petroleum gas, a gelling agent that comprises at least one gelling agent selected from the group consisting of: a polyvalent metal complex of an orthophosphoric acid ester, a polyvalent metal complex of an alkylphosphonic acid ester, a polyvalent metal complex of an unsymmetrical dialkylphosphinic acid, and any combination thereof, and a hydrocarbon-based servicing fluid; and placing the combined LPG servicing fluid into the subterranean formation at a pressure sufficient to create or extend at least one fracture in the subterranean formation.

31. The method of claim 30 wherein the liquefied petroleum gas comprises at least one compound selected from the group consisting of: methane, ethane, propane, butane, isobutane, and any combination thereof.

32. The method of claim 30 wherein the liquefied petroleum gas comprises at least one LPG fluid selected from the group consisting of: a gelled LPG fluid, an ungelled LPG fluid, and any combination thereof.

33. The method of claim 30 wherein gelling agent is present in the gelled LPG fluid in an amount in the range of from about 0.1% to about 2.5% by weight of the gelled LPG fluid.

34. The method of claim 30 wherein the gelling agent comprises at least one gelling agent selected from the group consisting of: a ferric iron polyvalent metal complex of an alkylphosphonic acid ester and an aluminum polyvalent metal complex of an alkylphosphonic acid ester.

35. The method of claim 30 wherein the gelling agent comprises at least one gelling agent selected from the group consisting of: a ferric iron polyvalent metal complex of an orthophosphoric acid ester and an aluminum polyvalent metal complex of an orthophosphoric acid ester.

36. The method of claim 30 wherein the gelling agent comprises at least one gelling agent selected from the group consisting of: a ferric iron polyvalent metal complex of an unsymmetrical dialkylphosphinic acid and an aluminum polyvalent metal complex of an unsymmetrical dialkylphosphinic acid.

37. The method of claim 30 wherein the fracturing fluid further comprises particulates.

38. The method of claim 30 wherein the relative percentages of the amount of the liquefied petroleum gas combined with the amount of the hydrocarbon-based varies during the treatment.

39. A method of gravel packing along a well bore comprising the steps of:

providing a gravel pack composition comprising liquefied petroleum gas, a gelling agent that comprises at least one gelling agent selected from the group consisting of: a polyvalent metal complex of an orthophosphoric acid ester, a polyvalent metal complex of an alkylphosphonic acid ester, a polyvalent metal complex of an unsymmetrical dialkylphosphinic acid, and any combination thereof, and a hydrocarbon-based servicing fluid; and placing the gravel pack composition into a well bore such that the particulates form a gravel pack substantially adjacent to the well bore.

40. The method of claim 39 wherein the liquefied petroleum gas comprises at least one compound selected from the group consisting of: methane, ethane, propane, butane, isobutane, and any combination thereof.

41. The method of claim 39 wherein the liquefied petroleum gas comprises at least one LPG fluid selected from the group consisting of: a gelled LPG fluid, an ungelled LPG fluid, and any combination thereof.

42. The method of claim 39 wherein gelling agent is present in the gelled LPG fluid in an amount in the range of from about 0.1% to about 2.5% by weight of the gelled LPG fluid.

43. The method of claim 39 wherein the gelling agent comprises at least one gelling agent selected from the group consisting of: a ferric iron polyvalent metal complex of an alkylphosphonic acid ester and an aluminum polyvalent metal complex of an alkylphosphonic acid ester.

44. The method of claim 39 wherein the gelling agent comprises at least one gelling agent selected from the group consisting of: a ferric iron polyvalent metal complex of an orthophosphoric acid ester and an aluminum polyvalent metal complex of an orthophosphoric acid ester.

45. The method of claim 39 wherein the gelling agent comprises at least one gelling agent selected from the group consisting of: a ferric iron polyvalent metal complex of an unsymmetrical dialkylphosphinic acid and an aluminum polyvalent metal complex of an unsymmetrical dialkylphosphinic acid.

* * * * *